Figures 1, 2:
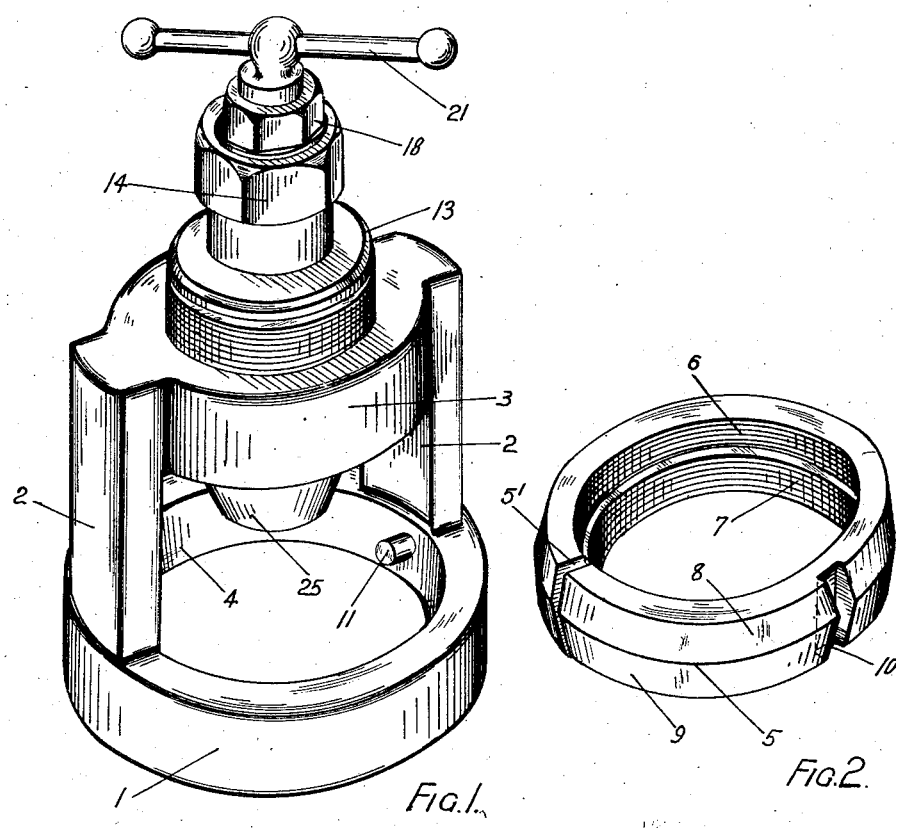

May 26, 1931. F. B. WEST ET AL 1,807,329
WHEEL DRAWER FOR USE ON MOTOR VEHICLES
Filed Nov. 29, 1929

Inventors
Frederich Bertrand West
and Kevin Joseph Pidcock
By B. Singer, atty.

Patented May 26, 1931

1,807,329

UNITED STATES PATENT OFFICE

FREDERICK BERTRAND WEST AND KEVIN JOSEPH PIDCOCK, OF KYOGLE, NEW SOUTH WALES, AUSTRALIA

WHEEL DRAWER FOR USE ON MOTOR VEHICLES

Application filed November 29, 1929, Serial No. 410,575, and in Australia September 18, 1929.

The invention relates to wheel drawers or "wheel-pullers" used for drawing a wheel of a motor vehicle from the axle to which it is keyed.

The object of the invention is to provide an improved device of this nature by means of which a wheel may be drawn from the axle, even in the most difficult cases, without the necessity of initially loosening the two units by injurious blows delivered to one or the other, as is found necessary with the majority of devices at present in use.

A further object is to facilitate the drawing of a wheel by the provision of a device necessitating only a light manual pressure to perform the operation.

The invention consists in a wheel-drawer comprising an element to contact with the axle, and means, adapted to engage the wheel and to be moved by fluid pressure in relation to the said element to draw the wheel from the axle.

The means for engaging the wheel may be of any suitable type but it is preferred to use a split ring nut to engage the portion of the wheel hub threaded for the wheel cap, said nut having a tapered outer surface engaged by a tapered ring of the device, and operating (when the device is in use) to compress or contract the nut upon the wheel hub threads to grip the latter securely when the drawing pressure is applied on the device. This construction eliminates the faulty grip usually obtained by a wheel-drawer upon the wheel and although not an essential to the invention materially increases the efficiency thereof.

The fluid pressure upon the element contacting with the axle is obtained by a suitable fluid ram assembly, preferably giving a mechanical advantage, and although the moving element or plunger of the assembly preferably contacts with the axle, the inverse arrangement (with a cylinder contacting with the axle) could be used, in which case the means for engaging the wheel would be connected to the plunger.

In other applications of the invention modifications thereof would probably be necessary, such as the provision of hooks (in place of the split nut) to engage a gear upon a shaft.

Any suitable fluid may be used in the ram, but oil is preferred.

Figure 3:
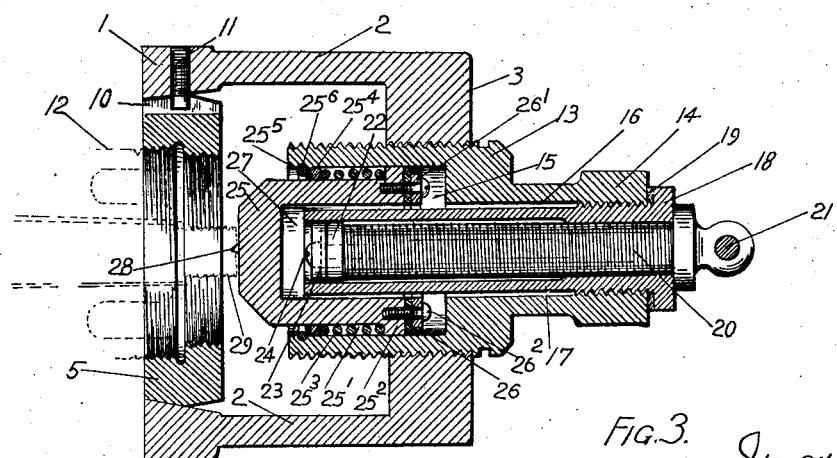

A preferred form of the invention is now completely described with reference to the accompanying drawings in which Fig. 1 is a perspective view of the wheel-drawer with the split nut removed, Fig. 2 a perspective view of the split nut, and Fig. 3 a central cross-sectional elevation of the wheel-drawer with the split nut in functional position upon a wheel hub (which is shown in dotted lines) and the plunger of the ram assembly in contact with the end of the axle, also shown in dotted lines.

Similar reference characters designate corresponding parts in the several figures of the drawings.

A ring 1 is joined by legs 2, 2 to a substantially circular head 3 disposed in a plane parallel to the plane of the ring, the elements comprising a spider structure or frame. The inner surface 4 of ring 1 is tapered, for the reception of a ring nut 5, split as at $5^1$, which is constructed to fit two sizes of wheel hub by the provision of internal threads 6 and 7 of differing diameters and the formation of the outer surface in two opposite and equal tapers 8 and 9, either one of which fits neatly into the taper surface 4 of the ring. When in position within the ring 4, a recess 10 in the nut is engaged by a dowel pin 11 projecting from the surface 4 of the ring so that rotation of the nut within the ring cannot occur while it is being threaded onto the wheel hub 12 (shown in dotted lines in Fig. 3) by rotation of the spider.

Threaded into head 3 is a cylinder 13 provided with an elongated nut-head 14 and a bore 15 which is open at one end and which is in communication at the other end with the central bore 16 of the nut-head.

An elongated cylinder 17 of smaller diameter than cylinder 13 is threaded into the nut-head 14 and is provided at one end with an integral nut 18 which is clamped, with an intermediate gasket 19, to nut-head 14, the inner end of cylinder 17 projecting into bore 15 of cylinder 13.

Threaded into cylinder 17 is a spindle 20 provided at one end with a manual turning bar 21 and at the other end (within the cylinder) with a plunger head 22 fitted with a packing washer 23 secured to the latter by a set screw 24. Rotation of bar 21 thus results in movement of the plunger within the cylinder.

Mounted within bore 15 of cylinder 13 is a plunger 25 provided at its inner end with a ring washer 26 retained thereon by a ring $26^1$ and set screws $26^2$ passing through the ring and the washer and tapped into plunger 25 in known manner.

The outer portion of the external surface of plunger 25 is reduced as at $25^1$, leaving a bearing strip $25^2$ which contacts with cylinder 13, and about the reduced portion $25^1$ is a light coil compression spring $25^3$ which contacts at one end with bearing strip $25^2$ and at the other end with a ring $25^4$ retained in position by a split spring ring $25^5$ seating in an annular recess $25^6$ in the outer end of cylinder 13. The spring $25^3$ urges the plunger 25 to the retracted position within cylinder 13, and prevents the plunger dropping from the cylinder. The plunger has a central bore 27 to receive, with clearance, the open end of cylinder 17, and on its outer end is a stud or pip 28 to engage the centering hole in the end of the axle 29 (shown in dotted lines in Fig. 3).

The clearance space of cylinders 13 and 17 and of bore 27 of plunger 25 are filled with a suitable oil.

Nut 5 is screwed onto the wheel hub 12, plunger 22 is fully retracted and cylinder 13 is screwed down to bring plunger 25 (which is also in the retracted position) into contact with the axle 29. In this position the greater part of the oil is within cylinder 17 and when bar 21 is turned plunger 22 traverses the cylinder towards the open end thereof and forces the oil therefrom into bore 27 and into the inner end of cylinder bore 15, exerting a fluid pressure on the plunger 25. As a result cylinder 13 is forced away from plunger 25 (which is stationary against axle 29) and draws the wheel with it through the medium of the spider, loosening the wheel from its key on the axle; and consequent on the rearward movement of the ring 1, and by reason of the contacting tapered or bevelled surfaces of the ring and of the nut 5, the latter is contracted to bite firmly on the thread on the wheel hub, so that there is little risk of the thread being stripped.

The area of plunger 22 being less than the area of plunger 25, considerable mechanical advantage results and an intensified pressure obtained, which combined with the leverage obtained by the threading of spindle 20, results in a great pressure being obtainable to perform the operation of drawing the wheel.

When the plunger 22 is again retracted within cylinder 17, spring $25^3$ forces the plunger 25 to a retracted position within cylinder 13 and maintains a continuous pressure upon the washer 26 thus preventing leakage of oil at this point.

What we claim and desire to secure by Letters Patent is:—

1. A wheel drawer comprising a split ring nut having a tapered outer surface, a spider having a ring with a tapered inner surface which is engaged by the tapered surface of the said nut, in the spider a head and screwed into the said head a cylinder of a fluid ram assembly, within the cylinder a plunger, secured within the cylinder and opening into the bore thereof a smaller cylinder, within the smaller cylinder a plunger and a manually rotatable screwed spindle to reciprocate the said plunger within the smaller cylinder.

2. A wheel drawer according to claim 1 in which the nut adapted to engage the wheel hub is of split ring type, on the outer surface of the nut two oppositely disposed and similar tapers, and on the inner surface of the nut two threads of different diameters.

Signed at Brisbane, in the State of Queensland, Australia, this fifteenth day of October, A. D. 1929.

FREDERICK BERTRAND WEST.
KEVIN JOSEPH PIDCOCK.